United States Patent

[11] 3,588,519

[72] Inventor Richard E. Luebrecht
    Wapakoneta, Ohio
[21] Appl. No. 851,972
[22] Filed Aug. 21, 1969
[45] Patented June 28, 1971
[73] Assignee Westinghouse Electric Corporation
    Pittsburgh, Pa.

[54] AUTOMATIC PARALLELING SYSTEM
    4 Claims, 2 Drawing Figs.
[52] U.S. Cl.................................................. 307/87
[51] Int. Cl................................................. H02j 3/00
[50] Field of Search.................................. 307/57, 84,
                    85, 86, 87, 43; 235/151 (F)

[56] References Cited
    UNITED STATES PATENTS
3,436,647 4/1969 Gobeli et al. .................. 307/87X 3,444,387 5/1969 Billings et al. ............... 307/87

Primary Examiner—Robert S. Macon
Assistant Examiner—H. J. Hohauser
Attorneys—A. T. Stratton, F. P. Lyle and G. H. Telfer ABSTRACT: A circuit for controlling the connection of an alternating current generator to an energized line for parallel operation with another generator is provided with transistor switching circuit means responsive to the voltage waveforms of the generator and of the line to produce a combined waveform with the duration at the maximum of the combined waveform being directly proportional to the phase difference, during which a capacitor is charged whose discharge signal is one input to a differential amplifier. The other input of the differential amplifier is a reference signal so that an output signal, resulting in closing of a switch for paralleling the generator, is produced only when a predetermined relation exists between the AC waveforms.

AUTOMATIC PARALLELING SYSTEM

BACKGROUND OF THE INVENTION

1. Field of the Invention

The invention relates to automatic paralleling of alternating current generators so that their connection is made when requirements of synchronism are met.

2. Description of the Prior Art

Systems providing a plurality of AC generators, such as in multiengine aircraft, have in the past included some means for connecting generators in parallel when their voltages, frequency and phase angle are close enough to the same values to prevent excessive system transients and to result in synchronous parallel operation. Normally each generator is provided with a control means or regulator for holding its frequency and voltage reasonably close to a desired value. A paralleling system is then required to provide sensing means responsive to relatively small differences in frequency and phase angle to close a circuit breaker or the like connecting a generator to an already energized line. While various systems differ in requirements, in a typical case for a 400 Hz. aircraft power system it may be desirable that the connection to place the lines in parallel only be made if there is no more than about 12° difference in phase or about 4 Hz. difference in frequency.

At one time systems employing electromagnetic relays were used for automatic paralleling. More recently it has been preferred to employ static sensing means because of their higher reliability and advantages of size and weight. One type of widely used static system employs a transformer connected between corresponding phases of the generator and the line to obtain a modulated voltage proportional to the phase difference. An example of such a system is disclosed in U.S. Pat. No. 2,862,111 by Richards et al. In such systems the bulk, weight and expense of the transformer are undesirably large, and efforts have been applied to design static systems without transformers.

An example of a transformerless, static system is that disclosed in U.S. Pat. No. 3,444,387 by Billings et al. There the two generator voltages are half-wave rectified and the half-wave voltages are superimposed to provide an input with the duration of zero voltage inversely proportional to phase angle. That input charges a capacitor whose voltage is compared with a reference level for producing pulses when within predetermined limits. The rate of occurrence of such pulses is used as an indicator of slip frequency in another circuit with capacitor charging and voltage level sensing to produce an ultimate output when both phase and frequency are sufficiently close on both AC lines.

Despite the utility of such prior systems, it remains desirable to achieve further simplification for greater miniaturization and cost reduction without sacrificing system capability.

SUMMARY OF THE INVENTION

Among the objects of this invention is to provide an automatic paralleling system that does not require a transformer or other bulky and expensive components and which requires only a relatively small number of circuit elements whose cooperative relation is such that means for phase difference sensing and frequency difference sensing are provided by the same subcircuit. Another object is to provide an automatic paralleling system that is insensitive to reasonably expected changes in generator voltages. Another object is to provide a system of components that are adaptable to integrated circuit technology.

The invention achieves the foregoing and additional objects and advantages through the provision of an automatic paralleling system that includes transistor switching circuit means responsive to the voltage waveforms of the generator and of the line to produce a combined waveform varying between a maximum and a minimum with the duration of the maximum being directly proportional to the phase difference. Means, such as a capacitor, responsive to the combined waveform develops a phase difference voltage directly proportional in magnitude to the duration of the maximum of the combined waveform. The charging and discharging of the capacitor results in a signal applied to a voltage detector such as one of the differential amplifier type for comparison with a reference voltage to produce an output only when such signal is below the reference and thus indicates sufficient phase synchronism.

The extent of discharge of the capacitor is related to slip frequency (the difference in frequency between the two lines). With proper component values the system may be designed so that the differential amplifier is not affected except when the capacitor discharges to an extent that goes below the operating point of the input transistor of the differential amplifier.

Voltage insensitivity is provided within the normal operating range of a regulated electrical system by reason of the fact that the generator and line voltages must be high enough to provide sufficient drive on the transistors that serve to compare and combine the AC voltage waveforms before the circuit is affected. Such transistors are resistively coupled to the AC lines and variation of the resistors permits designing for the desired voltage level.

Since the system requires only elements that are solid state as well as reasonably valued resistors and capacitors it is adaptable to integrated circuit technology.

DESCRIPTION OF THE PREFERRED EMBODIMENTS

Figure 1:
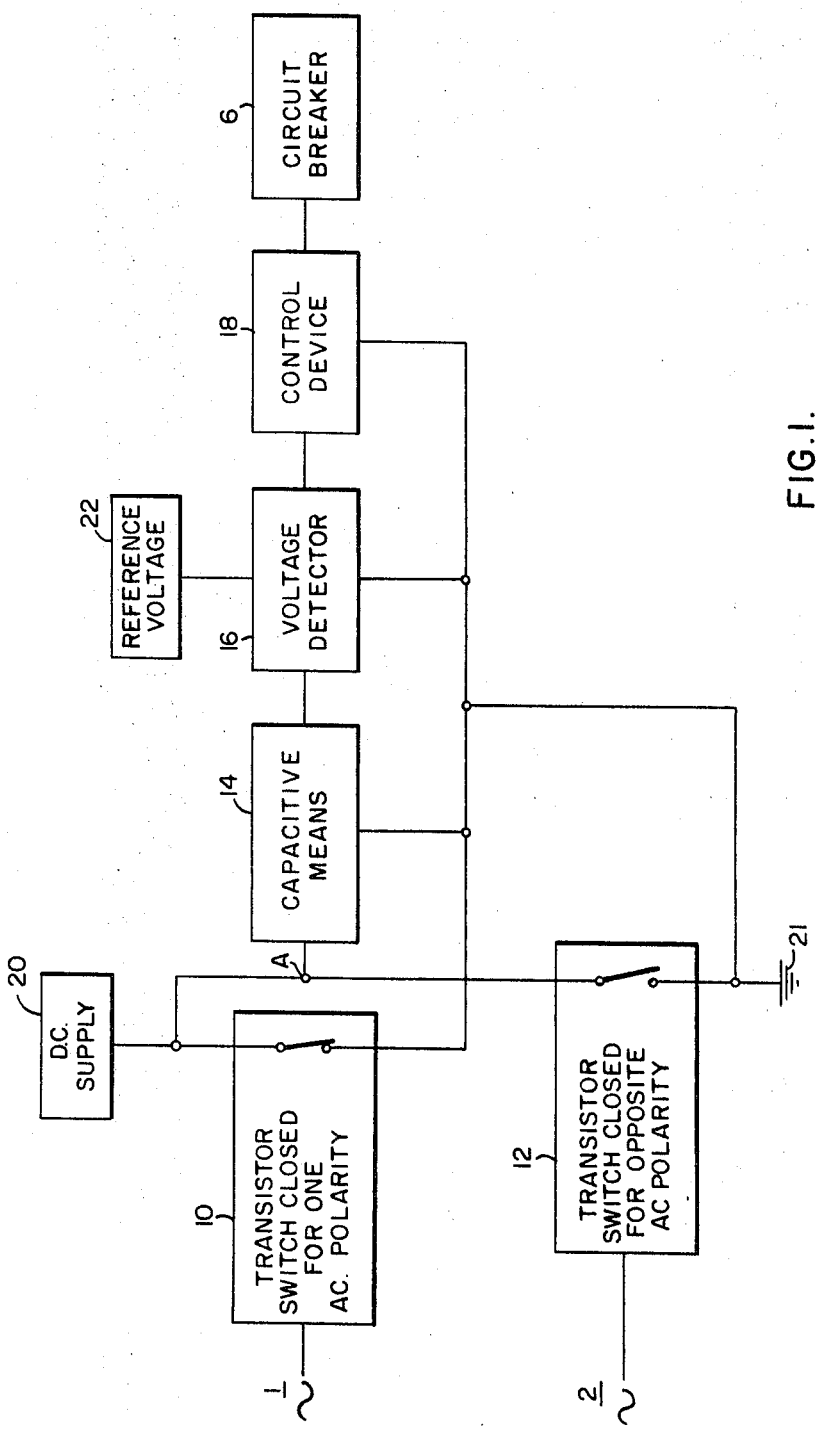
FIG. 1 is a block diagram of a system in accordance with the present invention.

Referring to FIG. 1, a system in accordance with this invention includes an energized bus 1 of an AC generator already connected to a load and an oncoming generator 2 to be paralleled with the energized bus 1 when requirements of synchronism between the two voltages exist. Normally the voltages of the two generators are provided with voltage regulators of any suitable type for maintaining the generator voltages sufficiently close to a desired value to permit paralleling. The generators may be of any desired type.

The energized bus 1 is connected to a first transistor switch means 10 that is conductive only on a first polarity half-cycle of the input waveform while the oncoming generator 2 is connected to a second transistor switch means 12 that is conductive only on the opposite polarity half-cycles of the waveform applied to it. More particularly, the transistor switch means 10 and 12 are designed for relatively full conduction during each half-cycle which they pass and therefore require other than merely rectifiers to perform their functions. Various solid state switching circuits may be used for means 10 and 12 of which examples will be subsequently described.

If the two generators are 180° out of phase the result is that the two means 10 and 12 are both nonconductive 50 percent of the time. If both generators are inphase the two means alternately conduct and maintain a low potential at the common point A; that is, each switch means 10 and 12 completes a current path from a voltage supply 20 to ground 21. Between 180° phase difference and 0° phase difference the voltage at the common point A varies between a maximum and a minimum with the duration of the maximum being directly proportional to the phase difference. In FIG. 1, the switches in boxes 10 and 12 are shown for a case in which switch 10 is conducting and switch 12 is not conducting, such as would occur during a half-cycle where there is 0° phase difference.

The elements thus far described effectively replace a transformer as has been employed in the prior art to produce an output representative of phase difference and slip frequency of the two alternating waveforms.

A means 14 including a capacitor is connected to common point A. The capacitor charges during those time segments in which both the selective conductive means 10 and 12 are nonconductive and discharges when either means 10 and 12 becomes conductive. The capacitive means 14 is connected to a voltage detector 16 so the voltage across means 14 is compared with a reference voltage 22 also applied thereto so that, when a predetermined relation exists between the two voltages, a pulse is applied to a control device 18 and thence to a circuit breaker 6 to effect closing of the system into parallel connection.

With minimum voltage on the capacitive means 14, as occurs upon synchronism of phase angle and slip frequency, then the voltage applied to the voltage detector would be zero or a minimum. If the two waveforms have momentarily synchronous phase but a slip frequency exists that is beyond the required limits then the capacitor will not discharge to the extent required to produce the unbalanced condition of the voltage detector 16 resulting in a pulse to the control device 18.

Figure 2:
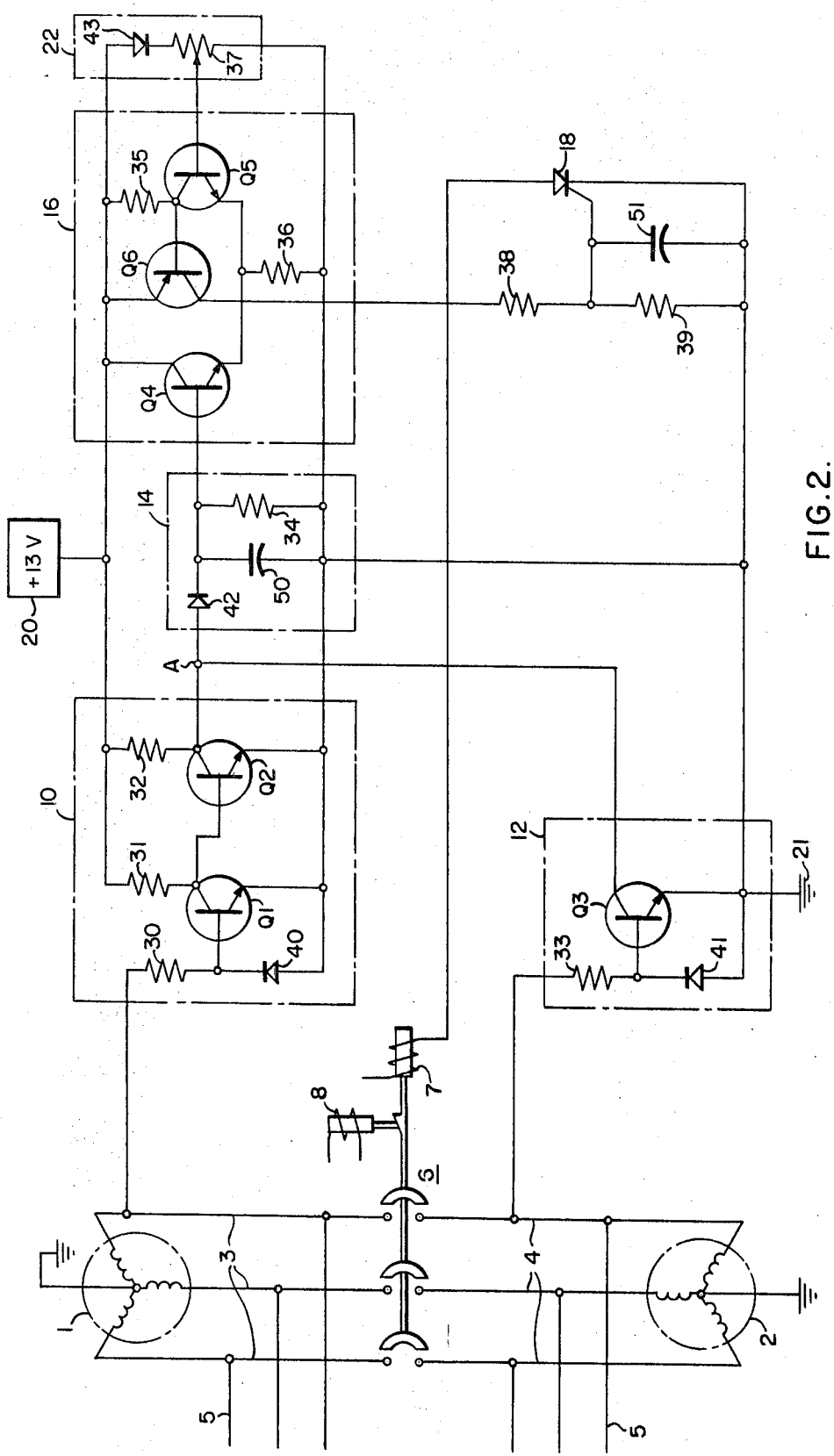
FIG. 2 is a circuit schematic of a more specific embodiment of the invention.

More specific examples of elements that may make up the functional units depicted in FIG. 1, and their operation, will be described in connection with FIG. 2. In FIG. 2 are shown generators 1 and 2 that in this example are shown as three-phase generators connected to three-phase lines of buses 3 and 4 for supplying load buses 5. The generators are connected together for parallel operation by means of the circuit breaker 6 which connects the buses 3 and 4 together. The circuit breaker 6 may be any suitable type of breaker and is shown as having a closing coil 7 which is controlled automatically by the paralleling circuit as will be described and which may also be provided with any desired additional means, represented by a trip coil 8 for automatic or manual operation.

Connected to bus 3 of generator 1 is a transistor subcircuit 10 that acts to conduct supply current only on half-cycles of a first polarity of the voltage on bus 3. In this example, subcircuit 10 includes a pair of NPN transistors Q1 and Q2. The base of Q1 is coupled through resistor 30 to the bus 3. The collector of Q1 is connected to the base of Q2 and is also resistively coupled to the DC supply 20 through resistor 31. The collector of Q2 is coupled through resistor 32 to the supply 20 and also to circuit point A. The emitters of Q1 and Q2 are both connected to ground 21. A diode rectifier 40 is connected across the base and emitter of Q1 with its anode connected to the emitter region. In the subcircuit 10, resistors 30, 31 and 32 set the operating levels of the transistors Q1 and Q2. Diode 40 conducts negative half-cycles of the voltage on bus 3 to avoid any damage to Q1. On positive half-cycles of the line voltage, Q1 is driven fully on, thus removing potential from the base of Q2 so that Q2 remains off and during that portion of the waveform a relatively high voltage may be applied to the common circuit point A. Thus, subcircuit 10 is selectively conductive only when receiving half-cycles of a first polarity (negative in this example) from the AC line. When Q2 conducts a low potential appears at point A and conversely when Q2 does not conduct a relatively high potential may appear at point A.

Similarly, but with opposite result, circuit portion 12 is connected to a line 4 of the oncoming generator 2 that corresponds to the energized bus 3 to which the subcircuit 10 is connected. Subcircuit 12 includes transistor Q3, also an NPN transistor in this example, with its base connected through resistor 33 to the line 4. Diode 41 is connected across the base and emitter of Q3 with the anode connected to the emitter. The collector of Q3 is connected to the common circuit point A and its emitter is at ground potential. The response of subcircuit 12 is to provide a conductive path from supply 20 to ground 21 only during positive half-cycles of the voltage on line 4 because such polarity voltage turns on transistor Q3.

It is therefore seen that when the two generators are exactly opposite in phase, Q2 and Q3 are both in the nonconducting state for one half of each cycle during which the potential at point A remains high. When both generators are inphase, Q2 and Q3 alternately conduct. Between 0° and 180° phase difference, the duration of each cycle during which the voltage at point A is relatively high is directly proportional to the phase difference. The variation in voltage at point A thus corresponds to the voltage that would appear on one side of the secondary winding of a transformer if its primary is connected across the AC lines 3 and 4. The phase difference and slip frequency of the AC lines are both included in the informational content of the voltage at point A.

Subcircuit 14 is responsive to the voltage at point A and includes a capacitor 50 connected to point A through diode 42 with the other side connected to ground 21. Resistor 34 is connected across capacitor 50 and provides a discharge path. The charging current for capacitor 50 is provided by current flow through resistor 32 when Q2 and Q3 are both in the nonconducting state. The charging current duty cycle varies from zero to 50 percent for phase differences of 0° to 180°. When the voltage level across capacitor 50 is low, and the generators are inphase, voltage detector 16 responds.

Subcircuit 16 includes NPN transistors Q4 and Q5 connected in differential amplifier fashion with their emitters connected together to ground 21 through resistor 36. The base of Q4 is connected to one side of the capacitor 50 while its collector is connected to the supply 20. The base of Q5 is connected to a subcircuit 22 providing a reference potential as determined by the setting of a variable resistor 37 connected to the base of Q5. Resistor 37 has one end connected through temperature-compensating diode 43 to supply 20. When the voltage level across capacitor 50 is sufficiently low so that Q4 stops conducting, transistors Q5 and Q6 conduct. Transistor Q6 is a PNP transistor with its base connected to the collector of Q5, which collector is also connected to the supply 20 through resistor 35. The emitter of Q6 is connected to supply 20 and its collector is connected to the control electrode of a control device or switching element 18 through resistor 38. When both Q5 and Q6 are conducting a pulse is supplied to control device 18 resulting in the closure of the circuit breaker 6. Control device 18 in this example is a thyristor which becomes conductive when a sufficient gate signal is applied. The gate of element 18 is also connected to ground potential through the parallel combination of a resistor 39 and capacitor 51.

The charging time of capacitor 50 is determined by the duration of maximum voltage at point A while its discharge time is of longer duration as determined by the value of resistor 34. The voltage at the base of transistor Q4 will be low enough to allow Q4 to stop conducting only when both the phase angle and the slip frequency are within limits. Since this voltage on the base of Q4 is compared with the reference voltage on the base Q5, resistors 34 and 37 provide means to control the slip frequency cutoff point and phase angle limits. At a high slip frequency, capacitor 50 does not discharge below the operating level of Q4. The lower the slip frequency, the lower capacitor 50 discharges until it decreases to the operating level of Q4, as determined by the setting of the resistors.

Systems as described have been designed and successfully operated over a temperature range of from −55° C. to +75° C. with a cutoff frequency of less than 4 Hz. and ±12° phase difference. By way of further example, the following table identifies the components employed in such a system for operation with AC lines of 400 Hz. and typical line voltages of 100 to 130 volts line to neutral:

| | |
|---|---|
| Q1, Q2, Q3, Q4, Q5 | 2N2219A |
| Q6 | 2N2904 |
| Thyristor 18 | GEC106B |
| Resistors 30 and 33 | 47 K ohms, ½ watt |
| Resistor 31 | 5.1 k ohms, ½ watt |
| Resistor 32 | 4.99 k ohms, ¼ watt |
| Resistor 34 | 150 k ohms |
| Resistors 35 and 38 | 4.7 k ohms |
| Resistor 36 | 20 k ohms |
| Resistor 37 | 20 k ohms (pot.) |
| Resistor 39 | 1 k ohms |
| Capacitor 50 | 0.1 mfd./100 v. |
| Capacitor 51 | 2.2 mfd./20 v. |
| Diodes 40, 41, 42, 43 | 1N914 |

Various circuit parameters may be varied for different system requirements. For example, the operating levels of transistors Q1 and Q3 may be adapted for different line voltages by variation of resistors 30 and 33. The phase angle limit and slip frequency cutoff may be varied by controlling the value of resistors 34 and 37. The values of resistor 32 and capacitor 50 may be changed to operate in different frequency systems (including 60 Hz.). In a particular system, it may be desirable to employ two fixed resistors instead of the variable resistor 37 so that this circuit portion may also be integrated. The system is amenable to integration although a discrete component system offers some advantage in greater selectivity of components. For example, it may be preferred that resistors 32 and 34 be zero temperature coefficient elements.

The selectively conductive means 10 and 12 are shown in FIG. 2 as specific transistor circuits although it will be understood that other configurations may be employed that include switching transistors or thyristors or other solid-state switching devices.

A variation would be to design the circuit for inverse operation. That is, the switching means 10 and 12 can be arranged so that capacitive means 14 is charged during a duty cycle that is longest for less phase difference. As an additional alternative, the capacitor 50 could develop a discharge pulse applied directly to the control device 18 although for more precise paralleling an intermediate voltage comparison stage is preferred.

While the present invention has been shown and described in a few forms only it will be apparent that various changes may be made without departing from its true scope.

I claim:

1. A system for effecting paralleling of an alternating current generator with an energized line, said system comprising: first selectively conductive means for responding to a first AC voltage waveform to conduct only during half-cycles of a first polarity of the waveform, second selectively conductive means for responding to a second AC waveform to conduct only during half-cycles of a second polarity of the waveform; capacitive means connected to said first and second selectively conductive means to charge only when both said first and second means are in the same state of conduction or nonconduction and to discharge when either of said first and second means switches to the opposite state of conduction or nonconduction; means responsive to voltage produced by charge on said capacitive means to effect paralleling only when said voltage has a predetermined relation to a reference level indicating sufficient synchronism of phase and frequency between the line and generator voltages.

2. The subject matter of claim 1 wherein: said first selectively conductive means comprises a first transistor switch means and said second selectively conductive means comprises a second transistor switch means.

3. The subject matter of claim 2 wherein: said first transistor switch means comprises a first transistor for receiving said first AC waveform at its base electrode, a second transistor for receiving at its base electrode the output from the collector electrode of the first transistor, the collector electrode of the second transistor supplying its output to said capacitive means at a common circuit point; said second transistor switch means comprises a third transistor for receiving said second AC waveform at its base electrode, the collector electrode of the third transistor supplying its output to said capacitive means at said common circuit point; said first, second, and third transistors all being of the same polarity.

4. The subject matter of claim 1 wherein: said means responsive to voltage produced by charge on said capacitive means comprises a voltage detector circuit for comparing capacitor voltage to said reference level and producing an output pulse when said predetermined relation exists; said pulse applied to a control device for closing a circuit breaker connecting the line and the generator.